US008677721B2

(12) United States Patent
Piana

(10) Patent No.: US 8,677,721 B2
(45) Date of Patent: Mar. 25, 2014

(54) APPARATUS AND METHOD FOR MARKING PLASTIC CONTAINERS

(75) Inventor: Stefan Piana, Koefering (DE)

(73) Assignee: Krones AG (DE)

( * ) Notice: Subject to any disclaimer, the term of this patent is extended or adjusted under 35 U.S.C. 154(b) by 195 days.

(21) Appl. No.: 12/481,481

(22) Filed: Jun. 9, 2009

(65) Prior Publication Data

US 2010/0147418 A1 Jun. 17, 2010

(30) Foreign Application Priority Data

Jun. 13, 2008 (DE) ........................ 10 2008 028 376

(51) Int. Cl.
*B65B 19/28* (2006.01)
*B65B 61/18* (2006.01)
*B65B 3/24* (2006.01)
*B65B 5/10* (2006.01)
*B65B 51/08* (2006.01)
*B65B 55/14* (2006.01)
*B65B 63/08* (2006.01)
*B65B 61/00* (2006.01)
*B65B 61/26* (2006.01)
*B31B 1/00* (2006.01)
*B31B 49/00* (2006.01)

(52) U.S. Cl.
USPC ........ 53/52; 53/411; 53/475; 53/415; 53/440; 53/131.1; 53/131.2; 493/3; 493/5; 493/7; 493/8; 493/9; 493/10; 493/11

(58) Field of Classification Search
USPC ............. 53/411, 475, 415, 440, 131.1, 131.2, 53/52; 493/3, 5, 7–11
See application file for complete search history.

(56) References Cited

U.S. PATENT DOCUMENTS

| 3,297,504 | A | * | 1/1967 | Brown et al. ................ 156/73.5 |
| 4,338,114 | A | * | 7/1982 | Brockway et al. ................ 65/28 |
| 4,852,415 | A | | 8/1989 | Bogatzki et al. ............. 73/865.8 |
| 5,315,108 | A | | 5/1994 | Gross ............................ 250/223 |
| 5,401,960 | A | * | 3/1995 | Fisun et al. .................... 250/271 |
| 5,653,900 | A | * | 8/1997 | Clement et al. .......... 219/121.68 |
| 6,768,504 | B2 | * | 7/2004 | Crawley et al. ............... 347/224 |
| 6,789,373 | B2 | * | 9/2004 | Bourdelais et al. ............. 53/411 |
| 6,859,270 | B2 | * | 2/2005 | Werzinger et al. ......... 356/239.1 |
| 7,126,124 | B2 | * | 10/2006 | Miyamoto .................... 250/340 |
| 7,144,356 | B2 | * | 12/2006 | Harnish ........................... 493/8 |
| 7,346,086 | B2 | * | 3/2008 | Ryan et al. ................. 372/29.02 |
| 7,405,667 | B2 | * | 7/2008 | Abe et al. ...................... 340/589 |

(Continued)

FOREIGN PATENT DOCUMENTS

| DE | 42 37 577 | 5/1993 | ............. B65B 61/00 |
| EP | 0 295 371 | 12/1988 | ............. G01N 21/90 |
| EP | 0 539 735 | 5/1993 | ............. B07C 5/34 |
| JP | 2000-46644 | 2/2000 | ............. G01J 1/04 |
| WO | WO 2004/038645 | 6/2004 | ............. G06K 7/12 |

OTHER PUBLICATIONS

Chinese Office Action, dated Dec. 23, 2011 (8 pgs).
Chinese Office Action issued in related application No. 2009101468272, dated Aug. 27, 2012 (13 pgs).

*Primary Examiner* — Jes F Pascua
*Assistant Examiner* — Derek Battisti
(74) *Attorney, Agent, or Firm* — Hayes Soloway P.C.

(57) ABSTRACT

An apparatus for marking plastic containers, comprising a marking device which applies a marking to the containers and a checking device in the form a temperature-sensitive sensor which checks for the presence of the marking on the container.

22 Claims, 1 Drawing Sheet

(56) References Cited

U.S. PATENT DOCUMENTS

| | | |
|---|---|---|
| 7,823,366 B2 * | 11/2010 | Schoeneck .................. 53/442 |
| 7,856,795 B2 * | 12/2010 | Grimard ..................... 53/411 |
| 2002/0140567 A1 | 10/2002 | Crawley et al. ............ 340/686.2 |
| 2005/0226288 A1 * | 10/2005 | Ryan et al. ................. 372/29.02 |
| 2009/0133593 A1 * | 5/2009 | Till ............................. 101/35 |

* cited by examiner

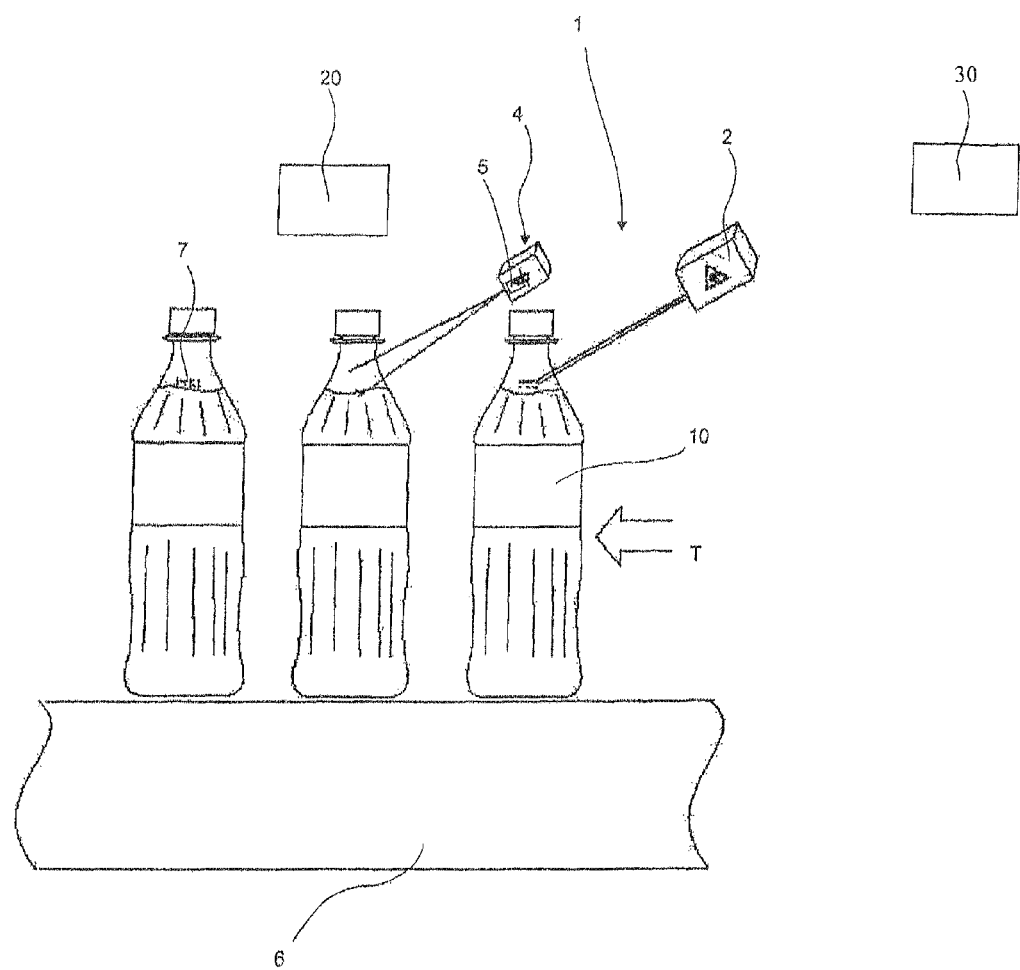

APPARATUS AND METHOD FOR MARKING PLASTIC CONTAINERS

BACKGROUND OF THE INVENTION

The present invention relates to an apparatus and a method for marking plastic containers. It is known in the prior art that plastic containers, such as PET bottles for example, are provided with various imprints. For instance, it is known to apply colour prints to plastic bottles, but it is also known to apply stamps to the container in order to mark an expiry date for example. In this case, it is desirable to check whether such imprints have actually been applied to the containers.

A method and an apparatus for applying a laser beam to moving containers is known from EP 0 539 735 A1. In this case, a laser beam is applied to returnable PET bottles in order to check the bottles and/or to read a code on the bottles. However, a check to ascertain whether the code has actually been applied to the bottles is not mentioned in this document.

An inspection machine for plastic bottles is known from EP 295 371 B1. This inspection machine comprises an optoelectric sensor which serves to detect a bottle code marking in the form of raised dots or dashes. However, such detection devices are very complex since they have to detect a specific pattern in a precise manner even at high transport speeds. Furthermore, it is known from the prior art that images of the containers are recorded in each case by means of image recording devices in order to ascertain whether the markings have been provided. However, such image recording devices are also very complex since they have to operate correctly even at high transport speeds.

Moreover, various difficulties arise in the known optical checking methods. Firstly, the contrasts in the image recording are often very weak. In addition, the image recording is often made more difficult due to an undefined background. This undefined background may be formed by air, more or less large-pore foam or a product exhibiting different degrees of colour or opacity. Further problems may arise if both the container and the product are transparent. In addition, external light and a small roughness depth may also cause difficulties during the measurement.

The objection of the present invention is to configure an apparatus for marking plastic containers in such a way that a simple and inexpensive checking of imprints that have been made is possible.

SUMMARY OF THE INVENTION

An apparatus according to the invention for marking plastic containers comprises a marking device which applies a marking to the containers and a checking device which checks for the presence of the marking on the containers. According to the invention, the checking device comprises a temperature-sensitive sensor.

It is thus proposed according to the invention to check a relevant marking, which is usually associated with an increase in temperature in a certain region of the container, on the basis of this increase in temperature. The temperature-sensitive sensor therefore measures whether a temperature increase has taken place locally in the region in which the marking is to be applied. The marking may be dates or imprints for example, but it would also be possible to apply larger images to the container by means of the marking devices.

During the marking or dating process using a laser, the wall of the container will be (briefly) heated to such an extent that the material melts locally at the surface. The marking can therefore be recognised as a warm region in a thermal image for a short time after application. In this way it is possible to omit a complex image evaluation having the problems mentioned above.

In one advantageous embodiment, the apparatus comprises a transport device which transports the plastic containers, and the checking device is arranged downstream of the marking device in the transport direction of the containers.

In a further advantageous embodiment, the marking device comprises a laser inscription unit. This laser inscription unit uses laser beams to etch a marking in a wall of the containers. As a result of this application of the marking, the temperature in said region of the container is increased locally and this temperature increase can be picked up by the temperature-sensitive sensor.

In a further advantageous embodiment, the checking device is arranged immediately after the marking device in the transport direction of the containers. This ensures that the temperature increase of the container can still be measured. Preferably, the distance of the checking device from the marking device is less than 500 mm, preferably less than 400 mm, particularly preferably less than 300 mm and particularly preferably between 150 mm and 300 mm.

Preferably, the temperature-sensitive sensor is an infrared-sensitive semiconductor sensor or a thermopile. A thermopile may for example be part of a pyrometer. Such a sensor absorbs thermal radiation and outputs a signal characteristic of this radiation.

In a further advantageous embodiment, the checking device is configured in such a way that it measures a temperature of a portion of the container in a contactless manner.

The present invention also relates to an installation for treating beverage containers and in particular for filling beverage containers, comprising an apparatus of the type described above and also a filling device, wherein the filling device fills the containers with a liquid. Preferably, the filling device is arranged upstream of the marking device and thus also of the checking device in the transport direction of the containers.

The present invention also relates to a method for marking containers with imprints or markings, wherein in a first method step a marking is applied to the container by means of a marking device, and in a further method step the presence of a marking on the container is checked. According to the invention, the checking for the presence of the marking takes place by means of a temperature-sensitive sensor or by means of a temperature measurement.

It is thus also proposed in the method according to the invention to ascertain the presence of the marking via a heating of the container, more specifically of the container in that region in which a marking has been applied or would have been applied.

Preferably, therefore, the marking takes place by the effect of heat on the container. The effect of heat is also understood here to mean the application of a laser beam which heats the material of the container at least locally.

Preferably, the marking is applied to a filled container. The present invention can be used with particular advantage in the case of filled containers since such filled containers are often difficult to inspect using conventional optical methods.

Preferably, a time period between the application of the marking to the container and the checking is less than 500 ms, preferably less than 400 ms and particularly preferably less than 300 ms.

BRIEF SUMMARY OF THE DRAWINGS

In a further preferred method, the marking contains a date indication.

Further advantages and embodiments will emerge from the appended drawing:

In the drawing:

FIG. 1 shows a schematic view of an apparatus according to the invention.

DETAILED DESCRIPTION

FIG. 1 schematically shows an apparatus 1 according to the invention for marking plastic containers 10. Here, reference 6 denotes a transport device 6 such as a transport belt, which conveys the containers 10 along a predefined transport path T from a filling device 30 past a marking device 2. However, the filling device also could be located downstream of the marking device. Also it would also be possible that the containers 10 are conveyed not by means of a transport belt but rather for example by means of a plurality of gripping clamps.

Reference 2 denotes a marking device, designed here as a laser, which applies markings to one region of the containers and in this case to a neck region of the containers 10.

However, it would also be possible that the marking device 2 applies the markings in a base region of the containers or in a middle region of the containers. Provided after this marking device 2 in the transport direction T of the containers is a checking device 4 which checks whether a marking 7 has been applied to the containers. If such a marking 7 has been applied, the container has a higher temperature in the corresponding region, which can in turn be detected by the checking device 4. Reference 5 denotes a temperature-sensitive sensor of the checking device 4.

It is thus proposed to arrange the checking device 4 at the transport device 6 shortly behind the marking device. Preferably, this checking device or the sensor has a measurement spot having a diameter of a few mm. The checking device 4 preferably outputs at an analogue output a signal which reflects a thermal sectional profile. Depending on whether the bottle or the wall thereof has been heated, the profile of each bottle exhibits a different emission.

As the checking device 4, use is preferably made of an infrared sensor 5 which has a short detection time in the region of approx. 3 ms or less. The checking device 4 also preferably allows a continuous observation of the process. The checking device 4 furthermore allows a rapid scanning along a line for example in the longitudinal direction of the containers, in order in this way to be able to discover hot spots in a rapid and reliable manner.

It would also be possible that the checking device 4 moves along a short portion of the transport path with the containers 10, or that a plurality of checking devices 4 are provided, for example for an imprint consisting of multiple lines.

Reference 20 denotes a processor device which receives the measured values output by the checking device 4 and compares said values with stored values. For instance, it is possible that limit values for the temperature of the containers are stored in a memory of this processor device, and based on a comparison with these limit values, it is possible to ascertain whether a heating of the respective container 10 has taken place and therefore also whether the marking 7 has been applied to the container. In this case, such a processor device 20 may also take account of further parameters, such as an external temperature or a transport speed of the transport belt.

Transport device 6 in which the containers are not only guided along a transport path T but are also rotated would also be conceivable. In this case, it would be possible in addition to arrange the checking device 4 in a different region in the circumferential direction of the containers 10, in order once again to be able to detect heated points. It would also be possible to arrange a plurality of checking devices 4 in the circumferential direction around the containers 10, and a plurality of marking device 2 could also be provide which mark the containers at different points both in the longitudinal direction of the containers and also in the circumferential direction of the containers.

All of the features disclosed in the application documents are claimed as essential to the invention in so far as they are novel individually or in combination with respect to the prior art.

The invention claimed is:

1. An apparatus for marking individual filled plastic containers made of PET, comprising a marking device which applies a marking to the containers wherein the marking device heats a wall of the container to melt the material of the container locally at a surface thereof, and a checking device which checks for the presence of the marking on the containers, wherein the checking device comprises a temperature-sensitive sensor containing an infrared-sensitive semiconductor sensor which measures whether a temperature increase has taken place locally in a region in which the marking is to be applied and outputs measured values to a processor device, wherein the apparatus includes a transport device to transport the containers in a transport direction and wherein the apparatus further comprises a processor device which receives measured values output by the checking device and compares said values with stored values, taking into account an external temperature in the region of the containers and transport speed of the containers to ascertain whether a marking has been applied to a container, wherein the checking device is arranged immediately after the marking device in the transport direction of the containers.

2. The apparatus according to claim 1, wherein the checking device is arranged downstream of the marking device in a transport direction (T) of the containers.

3. The apparatus according to claim 1, wherein the marking device comprises a laser inscription unit.

4. The apparatus according to claim 1, wherein the checking device is configured to measure a temperature of a portion of the container in a contactless manner.

5. An installation for filling beverage containers, comprising an apparatus according to claim 1 and a filling device which fills the containers with a liquid.

6. A method for marking individual filled plastic containers made of PET, with markings, comprising the steps:

applying a marking to the container using a marking device;

checking for the presence of the marking on the container, wherein the checking for the presence of the marking takes place using a temperature-sensitive sensor containing an infrared-sensitive semiconductor sensor or a thermopile which measures whether a temperature increase has taken place locally in a region in which the marking is to be applied, wherein a transport device transports the containers in a transport direction, and wherein the marking is applied to a wall of the container under the effect of heat wherein the wall is heated such that the material of the container melts locally at its surface; and comparing measured values outputted by a checking device by means of a processor device with stored values, taking into account an external temperature in the region of the containers and transport speed of the containers to ascertain whether a marking has been applied to a container, wherein the checking device is arranged immediately after the marking device in the transport direction of the containers.

7. The method according to claim 6, wherein a time period between the application of the marking to the container and the checking is less than 500 ms.

8. The method according to claim 6, wherein the marking contains a date indication.

9. The apparatus according to claim 2, wherein the marking device comprises a laser inscription unit.

10. The apparatus according to claim 2, wherein the checking device is arranged immediately after the marking device in the transport direction of the containers.

11. The apparatus according to claim 2, wherein the checking device is configured to measure a temperature of a portion of the container in a contactless manner.

12. The method according to claim 6, wherein a time period between the application of the marking to the container and the checking is less than 400 ms.

13. The method according to claim 6, wherein a time period between the application of the marking to the container and the checking is less than 300 ms.

14. The apparatus according to claim 1, wherein the transport device is a transport belt which conveys the containers along a predefined transport path or comprises a plurality of gripping clamps to grip the containers.

15. The apparatus according to claim 1, wherein the checking device has a measurement spot having a diameter of a few mm.

16. The apparatus according to claim 1, wherein the checking device has a detection time in the region of three ms or less.

17. The apparatus according to claim 1, wherein the checking device outputs at an analogue output a signal which reflects a thermal sectional profile.

18. The apparatus according to claim 1, wherein the processor devices takes into account a transport speed.

19. The apparatus according to claim 1, wherein the marking device applies markings to a neck region of the container.

20. An apparatus for marking individual filled plastic containers made of PET, comprising a marking device which applies a marking to the containers wherein the marking device heats a wall of the container to melt the material of the container locally at a surface thereof, and a checking device which checks for the presence of the marking on the containers, wherein the checking device comprises a temperature-sensitive sensor containing a thermopile which measures whether a temperature increase has taken place locally in a region in which the marking is to be applied and outputs measured values to a processor device, wherein the apparatus includes a transport device to transport the containers in a transport direction and wherein the apparatus further comprises a processor device which receives measured values output by the checking device and compares said values with stored values, taking into account an external temperature in the region of the containers and transparent speed of the containers to ascertain whether a marking has been applied to a container, wherein the checking device is arranged immediately after the marking device in the transport direction of the containers.

21. The apparatus according to claim 1, wherein the processor devices takes into account a transport speed to ascertain whether the marking has been applied to the container.

22. The method according to claim 6, wherein external temperatures which is taken into account by the processor to ascertain whether the marking has been applied to the container.

* * * * *